United States Patent
Sheng et al.

[11] Patent Number: 5,544,221
[45] Date of Patent: Aug. 6, 1996

[54] METHOD AND APPARATUS FOR PROHIBITING UNAUTHORIZED USE OF A TELECOMMUNICATION LINE

[75] Inventors: Huang Y. Sheng; Ching-hung Tsai; Wu J. Kuang, all of Hsinchu, Taiwan

[73] Assignee: Winbond Electronics Corporation, Hsinchu, Taiwan

[21] Appl. No.: 307,892

[22] Filed: Sep. 16, 1994

[51] Int. Cl.$^6$ ................................................ H04M 1/66
[52] U.S. Cl. .................................... 379/7; 379/35
[58] Field of Search .................... 385/1, 7, 39, 35, 385/21

[56] References Cited

U.S. PATENT DOCUMENTS 4,218,592  8/1980  Steinbergs et al. .................... 379/7
5,099,515  3/1992  Kobayashi et al. .................... 379/7 X

FOREIGN PATENT DOCUMENTS 2655224  5/1991  France .................... H04M 01/66
2187362  9/1987  United Kingdom .................... 379/7

*Primary Examiner*—Stephen Chin
*Assistant Examiner*—Paul Loomis
*Attorney, Agent, or Firm*—Fish & Richardson P.C.

[57] ABSTRACT

A method and apparatus for prohibiting unauthorized use of a telecommunication line is provided. An interference signal is timely generated by the invention on the telecommunication line such that the illegitimate user may not dial the number correctly. Therefore, the invention may prohibit the unauthorized use of a telecommunication line.

16 Claims, 4 Drawing Sheets

5,544,221

METHOD AND APPARATUS FOR PROHIBITING UNAUTHORIZED USE OF A TELECOMMUNICATION LINE

TECHNICAL FIELD OF THE INVENTION

This invention relates to a method and apparatus for prohibiting unauthorized use of a telecommunication line.

BACKGROUND OF THE INVENTION

It is often heard some illegitimate intruders use telecommunication lines owned by others and the innocent legitimate owner has to pay for the expense he is not obliged to pay. When unauthorized use of a telecommunication line occurs and the legitimate owner does not want to pay the charges, the telecommunication company are also indirectly affected. Therefore, a telecommunication line with a anti-theft mechanism is expected to meet this need.

SUMMARY OF THE INVENTION

To meet the need for the anti-theft mechanism of the telecommunication line, the invention provides a method and apparatus for prohibiting unauthorized use of a telecommunication line.

An interference signal is timely generated by the instant invention on the telecommunication line such that the illegitimate intruder may not dial the number correctly. Therefore, the invention successfully prohibits the illegitimate use of a telecommunication line.

The invention first determines if the telecommunication line is being used (step 1). If the result is true in step 1, the invention determines if an unauthorized equipment is using the telecommunication line (step 2). If the result is true in step 2, the invention generates an interference signal on the telecommunication line such that the unauthorized equipment may not dial the number correctly.

The spirit and further details of the invention will be further understood by the following detailed description of the invention along with the accompanied drawings.

DETAILED DESCRIPTION OF A PREFERRED EMBODIMENT

Figure 1:
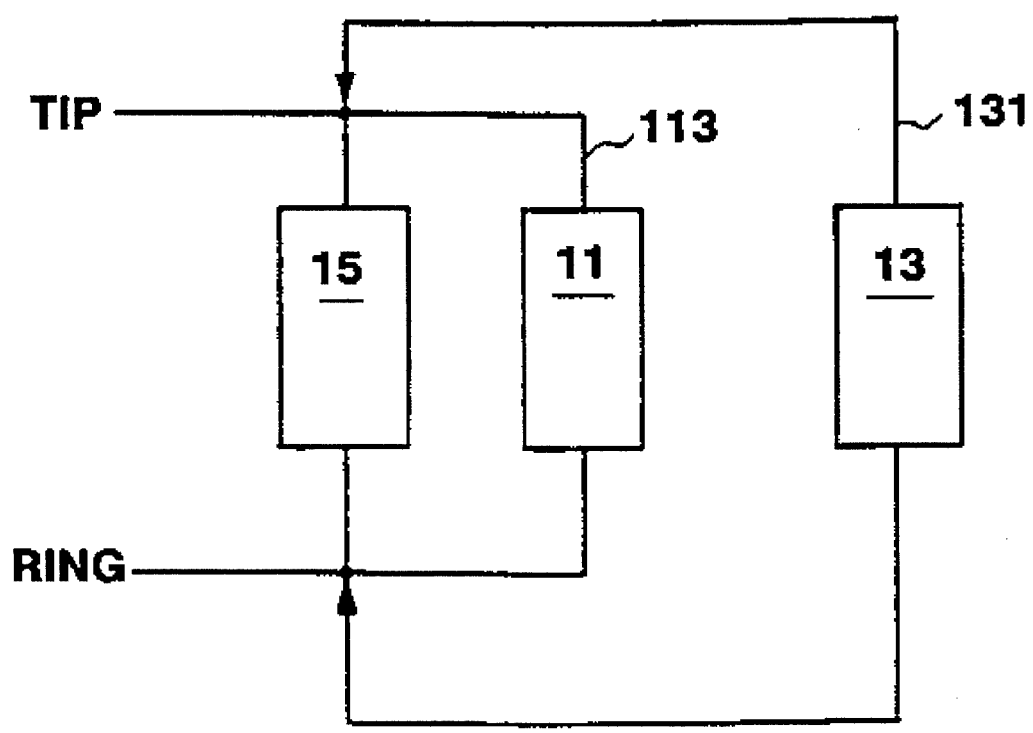
FIG. 1 shows a telecommunication line which is applicable by the invention.

As shown in FIG. 1, two terminals of the legitimate telecommunication equipment 11 are connected to the TIP and RING terminals respectively of the telecommunication line from the telecommunication company. The anti-theft apparatus 15 provided by the invention is also connected to the telecommunication line as shown and executes the steps recited hereinafter.

Figure 2:
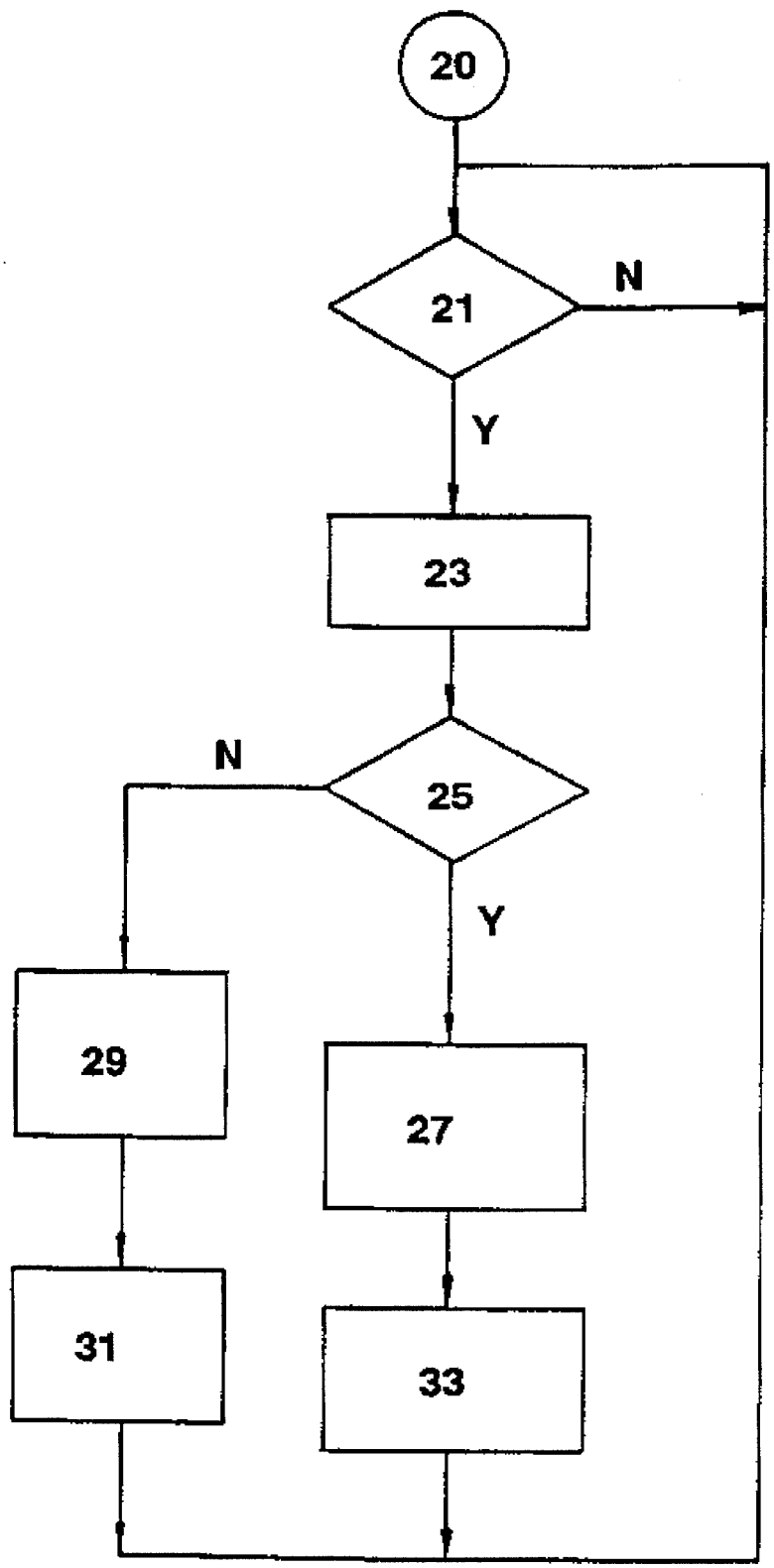
FIG. 2 shows the flow chart of the invention.

As the flow chart shows in FIG. 2, the invention first in step 21 detects the status, e.g. the electric voltage Ea, of the telecommunication line to determine if the telecommunication line is being used. If it is being used, in step 23, the invention generates an interrupt (INT) signal driving a microcontroller 19 (FIG. 3) to activate a dialer device 111 of the legitimate equipment 11. Afterwards, in step 25, the invention detects to determine if it is an illegitimate equipment 13 using the telecommunication line. If it is an illegitimate equipment 13, in step 27, the invention triggers the dialer device 111 of the legitimate equipment 11 to generate an interference signal 113 on the telecommunication line. This interference signal 113 interferes with the dialing signal 131 of the illegitimate equipment 13 and therefore the illegitimate user 13 may not accurately dials the number he intends to. At the same time, the invention generates warning signals, e.g. flashing video signal or audio signal, to notify the legitimate owner of the telecommunication line. Successively, in step 33, the invention deactivates the dialer device 111 of the legitimate equipment 11 and goes to step 21.

If it is NO in step 25, in step 29, the invention disables the dialer device 111 previously activated in step 23, and the in step 31 the legitimate equipment 11 enters a normal operation environment.

Figure 3:
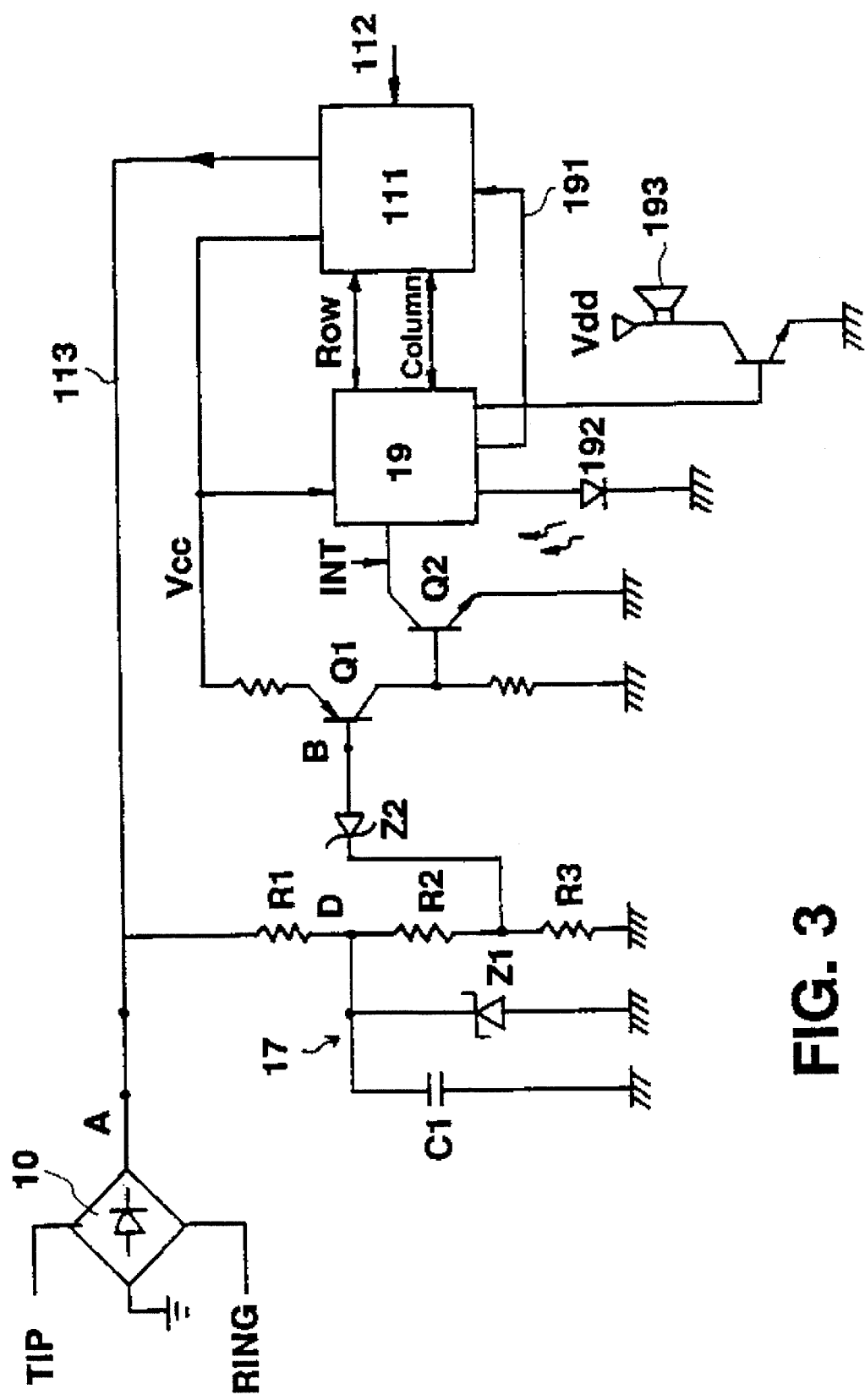
FIG. 3 shows circuit diagram of the preferred embodiment of the invention.

The preferred embodiment of the apparatus in accordance with the present invention, as shown in FIG. 3, includes a detection circuit 17 and a microcontroller 19. The detection circuit 17 mainly includes transistor Q1, Q2, voltage dividing resistor R1, R2, R3, capacitor C1, zener diode Z1 and Z2. The capacitor C1 is used to filter the alternating ringer signal which, when coming without capacitor C1, may malfunction the designed operation of the invention. The zener diode Z1 is used to build up a maximum voltage at terminal D such that voltage at D terminal never exceeds this maximum value. The zener diode Z2, which may be substituted with other typical diodes, is used to make sure the voltage of B terminal of the transistor Q1 is not higher than a predetermined value.

Figure 4:
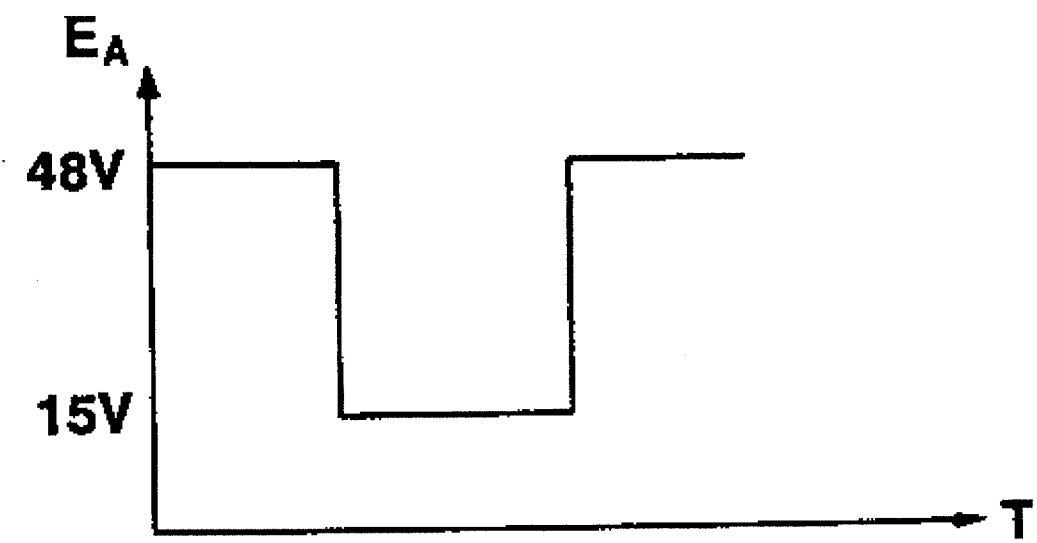
FIG. 4 shows the variation of the electric voltage of the telecommunication line while unused and used.

As the telecommunication line is not being used, the electric voltage Ea output from the telecommunication company is about 48 volts. As the telecommunication line is being used, the electric voltage Ea drops below about 15 volts. When the user puts down the handset (transmitter and receiver), the electric voltage Ea goes up to 48 volts again, as shown in FIG. 4.

Figure 5:
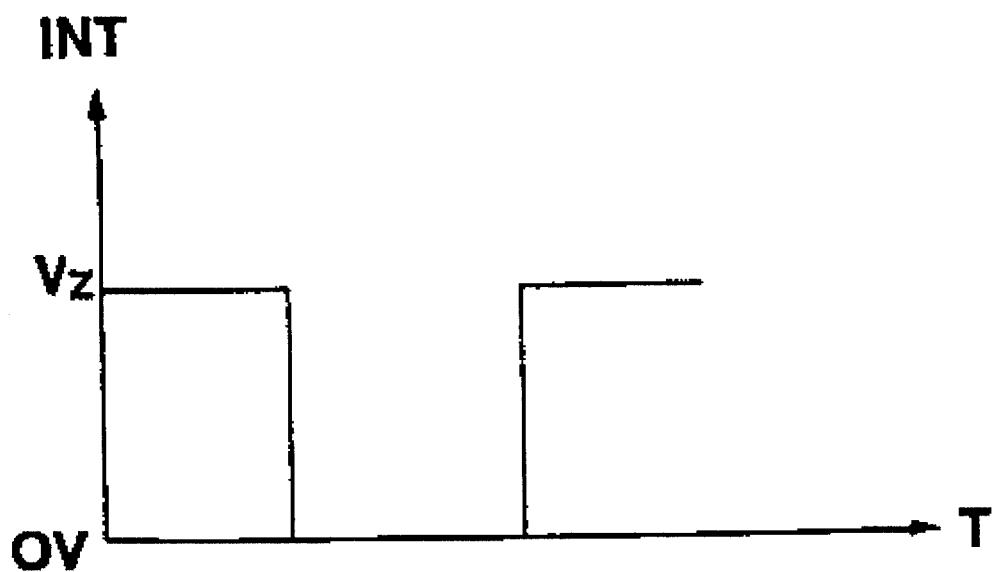
FIG. 5 shows the variation of an interrupt signal generated by the invention.

The detection circuit 17 is coupled to the TIP and RING terminals of the telecommunication line as shown, and as Ea is 48 volts the transistor Q1, Q2 are OFF which forces the INT signal logic HIGH. As Ea drops below 15 volts, the transistor Q1, Q2 are ON which forces the INT signal logic LOW, as shown in FIG. 5.

As the INT signal drops to logic LOW, the microcontroller 19 generates a triggering signal 191 to activate the dialer device 111 within the legitimate telecommunication equipment 11. Afterwards, through the status of the signals ROW and COLUMN, the program of the microcontroller 19 determines if the legitimate equipment 11 is using the telecommunication line. For instance, the dialer device 111 is designed in such manner that, as the legitimate equipment 11 uses the telecommunication line, the ROW line is logic HIGH and COLUMN line is logic LOW. Therefore, as long as the ROW line is not logic HIGH or COLUMN line is not logic LOW, the microcontroller 19 determines an unauthorized equipment 13 is using the telecommunication line. Furthermore, as the user picks up the handset (receiver and transmitter) of the legitimate equipment 11, a second triggering signal 112 also activates the dialer device 111. That is to say, the legitimate equipment 11 itself and microcontroller 19 both may activate the dialer device 111 to dial.

As the legitimate equipment 11 is detected to be using the telecommunication line in step 25, the microcontroller 19 ignores the asserted INT signal and de-activates the triggering signal 191. Under this condition, the legitimate equipment 11 enters into a normal operation mode as conventional one. However, as an unauthorized intruder 13 is detected to be using the telecommunication line in step 25, the microcontroller 19, in one respect, through the ROW and COLUMN signal lines, sends out a signal which forces the dialer device 111 to generate an interference signal 113 on the telecommunication line such that the unauthorized user 13 can not correctly dial the number he intends to. In another respect, the microcontroller 19 forces the LED 192 or speaker device 193 to generate warning signals informing the legitimate owner of the unauthorized use of his telecommunication line. The interference signal may be double tone multi-frequency signal, single tone signal or pulse signal. Also included in FIG. 3 is the rectifier 10 and the Vcc is the operating voltage of the microcontroller 19, transistor Q1 and Q2.

Although a telephone equipment is used as an example in the above preferred embodiment, it is obvious to skilled person that the principle and spirit of the invention is well applicable to the telecommunication line for facsimile equipment.

What is claimed is:

1. A method for prohibiting use by unauthorized user equipment of a telecommunication line intended for use by legitimate telecommunication equipment, the legitimate telecommunication equipment having a dialer circuit for generating a dialing signal, the legitimate telecommunication equipment coupled to an anti-theft apparatus and the telecommunication line, the method comprising the steps of:

(1) determining, by the anti-theft apparatus, if the telecommunication line is being used;

(2) if the result is true in step (1), the anti-theft apparatus determining if the use is by the unauthorized user equipment;

(3) if the result is true in step (2), the anti-theft apparatus sending a trigger signal to the dialer circuit of the legitimate telecommunication equipment which generates an interference signal on the telecommunication line to prevent use by the unauthorized user equipment.

2. The method as recited in claim 1, wherein the determining of step (1) includes detecting the variation of an electric voltage of the telecommunication line.

3. The method as recited in claim 1, the step of (2) is performed by a microcontroller.

4. The method as recited in claim 1, wherein the step of sending an interference signal includes sending a double tone multi-frequency signal.

5. The method as recited in claim 1, wherein the step of sending an interference signal includes sending a single tone signal.

6. The method as recited in claim 1, wherein the step of sending an interference signal includes sending a pulse signal.

7. The method as recited in claim 2, wherein, while unused, the electric voltage of the telecommunication line is substantially 48 volts and, while used, the electric voltage of the telecommunication line is substantially below about 15 volts.

8. A telecommunication line anti-theft apparatus coupled in parallel to telecommunication equipment, the telecommunication equipment coupled to a telecommunications line and having a dialer circuit for generating a dialing signal on the telecommunication line, the anti-theft apparatus comprising:

a detection circuit, which in response to a first status of the telecommunication line, generates an interrupt signal indicating that the telecommunication line is in use; and;

an identification circuit, which, in response to the interrupt signal and a status signal from the dialer circuit of the telecommunication equipment, sends a triggering signal to the telecommunication equipment to cause the dialer circuit to generate an interference signal on the telecommunication line, said status signal indicating unauthorized use of the telecommunication line.

9. The apparatus as recited in claim 8, wherein the first status is an electric voltage of the telecommunication line.

10. The apparatus as recited in claim 8, wherein the identification circuit is a microcontroller.

11. The apparatus as recited in claim 8, wherein the interference signal a double tone multi-frequency signal.

12. The apparatus as recited in claim 8, wherein the interference signal a single tone signal.

13. The apparatus as recited in claim 8, wherein the interference signal a pulse signal.

14. The apparatus as recited in claim 9, wherein, while unused, the electric voltage of the telecommunication line is substantially 48 volts and, while used, the electric voltage of the telecommunication line is substantially below about 15 volts.

15. The method as recited in claim 1 wherein, in step (3), the interference signal is a dialing signal.

16. The telecommunication line apparatus of claim 8 wherein the triggering signal sent by the identification circuit to the telecommunications equipment, causes the dialer circuit to generate the interference signal in the form of a dialing signal.

\* \* \* \* \*